US007522582B2

(12) United States Patent
DeGolia, Jr. et al.

(10) Patent No.: US 7,522,582 B2
(45) Date of Patent: Apr. 21, 2009

(54) EMBEDDED WEB PHONE MODULE

(75) Inventors: Richard Case DeGolia, Jr., Los Altos, CA (US); Dan Kikinis, Saratoga, CA (US)

(73) Assignee: Genesys Telecommunications Laboratories, Inc., San Francisco, CA (US)

( * ) Notice: Subject to any disclaimer, the term of this patent is extended or adjusted under 35 U.S.C. 154(b) by 0 days.

(21) Appl. No.: 11/685,376

(22) Filed: Mar. 13, 2007

(65) Prior Publication Data

US 2007/0165616 A1    Jul. 19, 2007

Related U.S. Application Data

(63) Continuation of application No. 10/153,981, filed on May 22, 2002, now Pat. No. 7,190,692, which is a continuation of application No. 09/146,849, filed on Sep. 3, 1998, now Pat. No. 6,411,615.

(51) Int. Cl.
*H04L 12/66* (2006.01)
*H04L 12/56* (2006.01)
(52) U.S. Cl. ............... 370/352; 370/395.2; 370/395.52; 709/229
(58) Field of Classification Search ......... 370/352–356, 370/392, 395.2, 395.52, 400–404, 466, 410, 370/395.31, 389, 353; 709/201–225, 249, 709/250
See application file for complete search history.

(56) References Cited

U.S. PATENT DOCUMENTS

| 5,938,727 | A | * | 8/1999 | Ikeda | 709/218 |
| 5,958,016 | A | * | 9/1999 | Chang et al. | 709/229 |
| 6,144,667 | A | * | 11/2000 | Doshi et al. | 370/401 |
| 6,393,015 | B1 | * | 5/2002 | Shtivelman | 370/352 |
| 6,411,615 | B1 | * | 6/2002 | DeGolia et al. | 370/352 |

* cited by examiner

*Primary Examiner*—Afsar M. Qureshi

(57) ABSTRACT

A system for enabling Data Network Telephony (DNT) communication through a WEB page includes a Web server hosting an interactive WEB page and having an Internet port, a link in the WEB page adapted for launching a DNT-capable telephone module, and a DNT-capable telephone module associated with the link. In this system, upon selection of the link by a person accessing the WEB page over the Internet using a computer platform, an instance of the IP telephone module is downloaded to computer platform, and an IP call is launched to an IP address pre-stored and associated with the link. The DNT network may be the Internet. In a preferred embodiment the system first investigates the computer platform for hardware and software characteristics, and attaches the determined characteristics to the instance of the IP telephone module to be downloaded. The downloaded module then self-launches and configures, and then launches the associated call. In some embodiments the module disappears after a single call, and thus serves as an instant enabler for IP telephony.

17 Claims, 4 Drawing Sheets

EMBEDDED WEB PHONE MODULE

CROSS-REFERENCE TO RELATED DOCUMENTS

The present application is a continuation application of co-pending patent application Ser. No. 10/153,981, filed on May 22, 2002, which is a continuation of patent application Ser. No. 09/146,849, filed on Sep. 3, 1998 and issued as U.S. Pat. No. 6,411,615 on Jun. 25, 2002, which are incorporated herein in their entirety by reference.

FIELD OF THE INVENTION

The present invention is in the field of Data Network Telephony (DNT) and pertains more particularly to methods and apparatus for providing an Internet Protocol (IP) telephone capability from a WEB page to persons accessing the WEB page, and who do not have the capability.

BACKGROUND OF THE INVENTION

Data Network Telephony (DNT), which encompasses Internet Protocol Network Telephony (IPNT), is a relatively recent development in the art of telecommunications wherein a communication center connected to a Wide Area Network (WAN) may receive and initiate multimedia transactions such as E-mails, IP phone calls, IP Video transaction, and the like.

Man-DNT enhanced communication centers known to the inventor also maintain computer telephony integration (CTI) capabilities for connection-oriented-switched-telephony (COST) telephone systems, which are the conventional, dedicated-connection telephone systems. Such communication centers may receive calls from a digital data packet network such as the Internet, or from a traditional COST telephony network.

Continuing development in the field of IPNT has led to varying sorts of IP phone applications that are adapted as communication tools used in business as well as in the private domain. IP phone applications are typically proprietary programs used in a service wherein one must subscribe to or purchase a software application, install an instance of the software on one's personal computer, and run the application whenever calling out or receiving incoming calls from others.

Many existing IP phone applications also come with a variety of other options available to a user. These additional options include file sharing, file transfer, messaging, conferencing, and so on. In particular instances, video conferencing is also available with such applications. General requirements for using one of these applications include Internet connectivity, sound card installation and configuration, speaker and microphone apparatus, and in some cases, a video capture device and video data send and receive capabilities.

Although these communication programs lend much to the field of DNT, they are designed largely for recreation or entertainment purposes and there are some inconveniences which must be endured by the user operating such a program. For example, a successful connection from a caller using an IP program to an individual using a compatible program generally requires that the individual and the caller be connected via a directory-network-server adapted to effect connection. These servers are maintained by the company or other organization providing the application. Often, there are several if not dozens of servers to choose from. Many of these servers may be down or off-line when a user attempts to connect. Waiting to connect to a server can frustrate a caller especially if the wait is for a considerable time period.

Another issue is that current IP applications are not largely compatible with IP applications of varying manufacture due, at least in part, to their proprietary nature. Furthermore, there are considerable download and configuration requirements with which one must contend when installing an IP application. In some cases, only specific hardware elements are supported and required before the application may be launched.

The issues described above apply both to the business community and to the private sector. Therefore, it is desired, at least from a perspective that focuses on business use of IP applications, that a more direct approach to such communication be achieved minimizing inconvenience to users wishing to communicate via IP phone.

More particularly in business, such as in the environment of a company-hosted communication center, it is desired that callers have IP programs that are compatible to those supported by the center. If a caller has an IP program that is not compatible with the communication center's supported IP application(s), he or she may not wish to install and configure yet another program. Software installations of numerous IP programs take otherwise available drive space and can be confusing in terms of deciding which program to use.

What is clearly needed is an embedded IP phone module, such as in a WEB page, that enables a single and direct customer interaction with a predetermined number in a fashion that minimizes any inconvenience caused by downloading, installing, or configuring operations that are required with traditional IP phone applications.

SUMMARY OF THE INVENTION

In a preferred embodiment of the present invention a system for enabling Data Network Telephony (DNT) communication through a WEB page is provided, comprising a Web server hosting an interactive WEB page and having an Internet port; a link in the WEB page adapted for launching a DNT-capable telephone module; and a DNT-capable telephone module associated with the link. Upon selection of the link by a person accessing the WEB page over the Internet using a computer platform, an instance of the IP telephone module is downloaded to computer platform, and an IP call is launched to an IP address pre-stored and associated with the link.

In a preferred embodiment the DNT-capable telephone module is adapted for Internet Protocol (IP). Also in preferred the WEB page may be a multi-tenant page representing a plurality of hosts, the different hosts represented by different portions of the page, and different DNT calls may be launched to different hosts according to placement of links according to the different portions. In this aspect different organizations may be represented by distinct banners, and DNT modules may be launched and calls placed to the different organizations by iconic links placed in the banners associated with the organizations.

In some instances there is a computer telephony integration (CTI) server executing on a CTI processor connected to the WEB server by a data link. The CTI server may be adapted to provide the DNT-capable telephone module. The CTI server may additionally have a data link separate from the Internet, further adapted to transmit data associated with a launched DNT call on the separate data link. The downloaded instance of the DNT-capable telephone module is one of a Java™ Applett, a WEB browser plug-in, or a Macintosh™ application.

In some embodiments the downloaded instance of the DNT-capable telephone module is adapted to uninstall and disappear after a pre-stored number of calls, which may be a single call.

In another aspect of the invention methods are provided for practicing the invention using the system described in general terms above. In yet another aspect a software module is provided with code adapted to provide the functions described above in the system descriptions.

The present invention in various aspects and embodiments described in enabling detail below provides for the first time a way to facilitate DNT calls between computer platforms without a necessity for a caller to first install and configure a DNT application, and a way for enterprises to enable quick and efficient communication with virtually any person accessing an enterprise-hosted WEB page, or a WEB page shared by the enterprise with other organizations.

BRIEF DESCRIPTION OF THE DRAWING FIGURES

DESCRIPTION OF THE PREFERRED EMBODIMENTS

Figure 1:
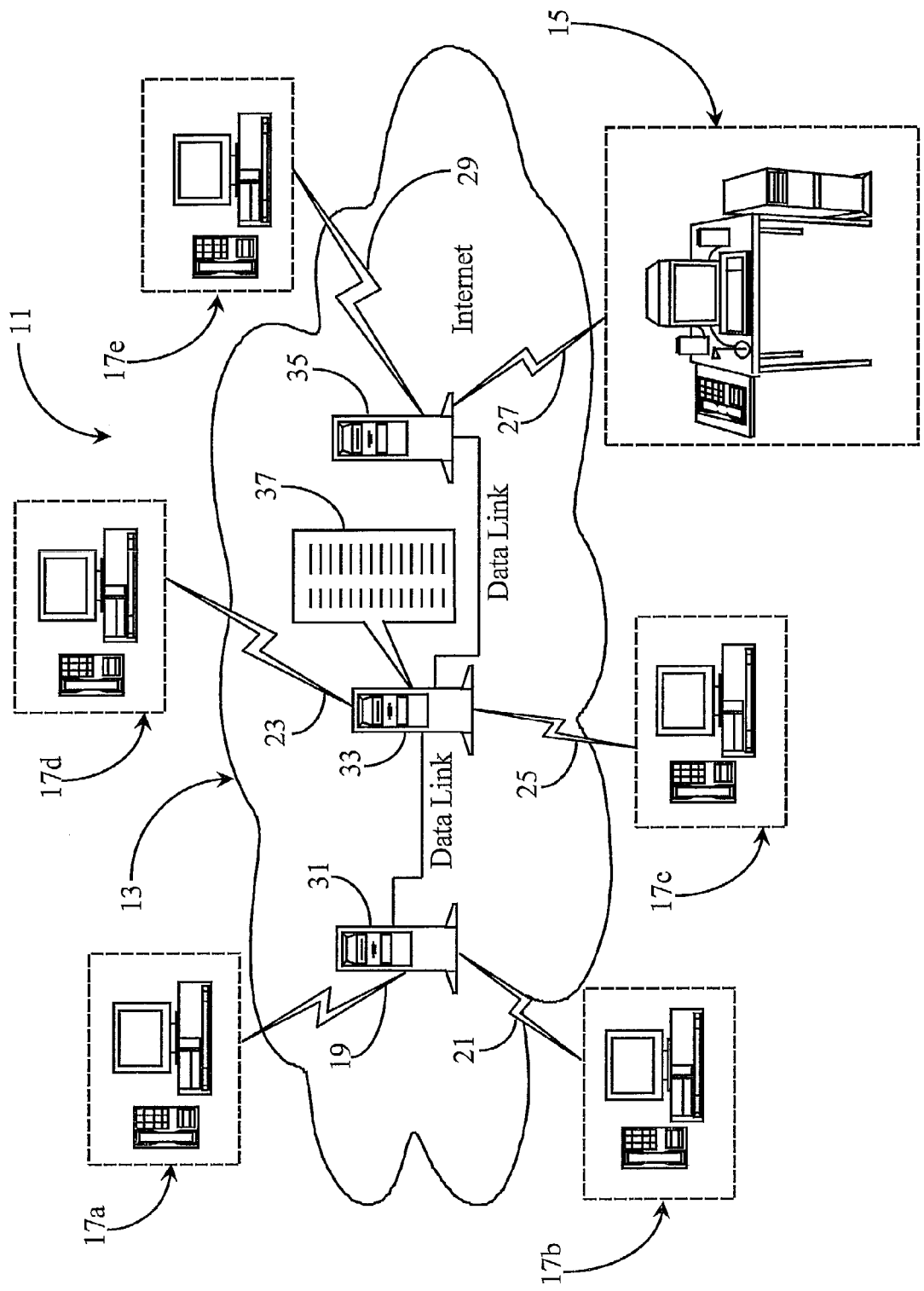
FIG. 1 is a system diagram illustrating a normal user-to-user IP phone connection scheme according to prior art.

FIG. 1 is a system diagram illustrating a normal user-to-user IP phone connection scheme according to prior art. Network architecture 11 comprises a WAN 13, a communication center workstation 15, and an array of remote IP callers 17a-17e. In this prior art configuration, WAN 13 is the well-known Internet wherein both private and business use of an IP application is routine and known in the art. WAN 13 may be of another form of IP network known in the art such as a corporate Intranet, or other private WAN's. However, in this prior art example as well as embodiments of the present invention, the example of the Internet is used as IP programs are largely designed for use with the Internet, hence the term Internet Protocol (IP).

Communication center workstation 15, hereinafter referred to as station 15, represents just one of many such stations that maybe found in DNT-capable communication centers. Station 15 contains all of the necessary equipment and capability for communicating with callers. For example, a personal computer having a video display unit PC/VDU is illustrated along with speakers, a microphone, and a COST telephone. Other typical equipment and connections (not shown) may include local area network (LAN) connection, internal COST telephony wiring (to phone), and so on.

Callers 17a-17e represent individuals engaged in communication with each other using prior art IP applications installed on each of their PC/VDU's. Also shown with respect to each caller's capability is a COST telephone. Connection to WAN 13 (Internet) for callers 17a-17e is typically maintained through Internet service provider ISP connections 19, 21, 23, 25, 27, and 29. Such connections illustrated are defined as logical network connections as may be achieved through WAN 13.

As previously described, each caller such as caller 17a, for example, is running an instance of an IP phone application such as are known in the art. For example, caller 17a and caller 17b may communicate through a connection or directory server 31. Caller 17d and 17c are shown similarly engaged through a directory server 33. Caller 17e is engaged with an agent operating station 15 via connection server 35.

Connection servers 31, 33, and 35 are (in this case) maintained by manufacturers of IP software used by the callers. In order to communicate with each other via IP phone, callers must have compatible software and in many cases specific hardware installed and operative on their respective PC/VDU's.

Each directory server may have a different assigned topic so as to attract interested callers. For example, server 31 may be a private adult server, server 33 may be an open recreational server, and server 35 is, in this case, a business server. Therefore, users of a particular IP application may be presented a choice of servers and may surf from one to another according to preference. Directory servers 31, 33 and 35 are shown connected in WAN 13 via data link as is known in the art.

A list 37 shown associated with server 33 typically lists all users who are adapted to connect to that server and their active states of communication (busy or not). A list such as list 37 is typically associated with each available server and is presented to a caller such as callers 17a-17e when they connect to such servers. A screen pop-up will typically list the server names and persons available when the directory option is chosen.

Caller 17e is shown connected to server 35 which in this case, is a business server. Company and business personnel may log in to server 35 during their working day in order to accept calls from the public. A brief description of their products or services may be included in a list such as list 37 described above.

An IP telephony architecture such as illustrated in this example does not always effectively facilitate business use as would be desired in a company communication center environment. One reason is that software must be downloaded and configured by all parties wishing to communicate. Often, as software updates to an IP application become available, users must download additional software, and in some cases, reconfigure parameters. Customer service regarding such applications can be frustrating as well.

As briefly described in background section, some IP applications are designed more for business use than for the private domain. These programs allow users to set up virtual offices which are actually WEB pages allowing collaboration, file sharing, direct IP voice calls, messaging, and so on. However, as is the case with the other prior art examples illustrated, connection is typically made through a server as is common and known in the art. Moreover the same software parameters pertaining to downloading and configuring apply as well.

The present inventors have found that while the current art IP applications may be adequate in many instances, they do little to address many other issues surrounding business conducted within company-hosted communication centers wherein it is desired to optimize agent functionality and to maximize customer satisfaction. Therefore, it is an object of the present invention to provide an executable IP phone module that allows direct access to on-line agents without requiring substantive download or configuration by a caller.

Figure 2:
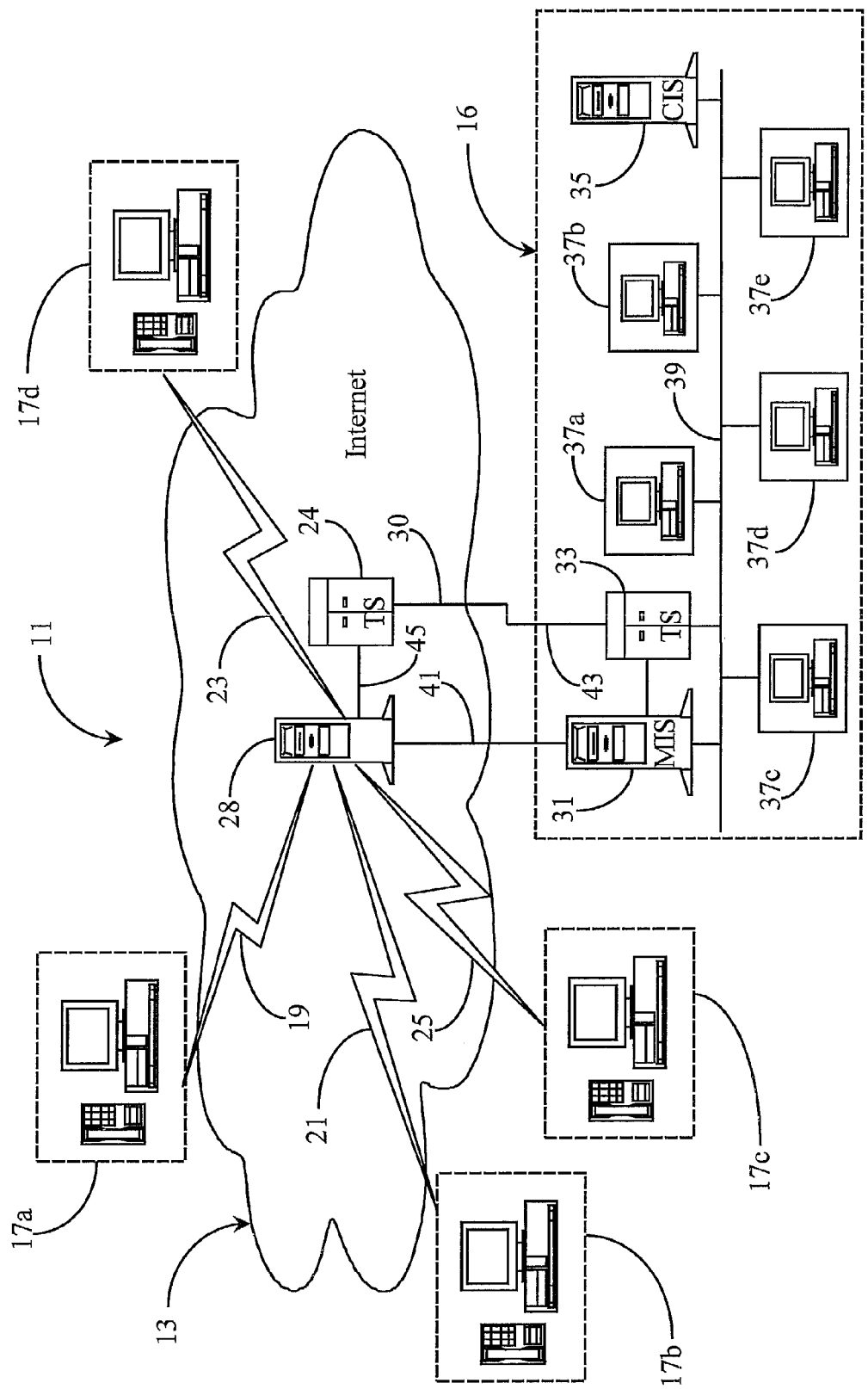
FIG. 2 is a system diagram illustrating an embedded IP phone connection scheme according to an embodiment of the present invention.

FIG. 2 is a system diagram illustrating an embedded IP phone connection scheme according to an embodiment of the present invention. In an effort to avoid redundancy and to save space, elements found in FIG. 1 that are also found in FIG. 2 will not be formally re-introduced unless they have been modified according an embodiment of the present invention, in which case, such enhancements are assigned new element numbers and are described in detail with regards to each particular element.

Architecture 11 in FIG. 2 now comprises WAN 13 and a communication center 16 which is connected to a WEB server 28 in WAN 13 (in this example the Internet) via a network connection 41. Communication center 16 further comprises agent workstations 37a-37e that are connected to each other via a local area network (LAN) 39. Two servers 31 and 35 are also connected to LAN 39. Server 31 is a multimedia server (MIS) adapted to store multimedia events such as e-mail voice messages, video mails, and the like. Server 35 is a customer information system (CIS) adapted to store knowledge about existing, and in some cases, potential clients. Further, it will be apparent to those with skill in the art that such servers are a convenience for certain functions, and are not essential to the invention.

According to a preferred embodiment of the present invention, a computer telephony integration (CTI) processor 33 is provided and connected to LAN 39 and to multimedia server 31. Processor 33 executes an instance of a CTI application known to the inventor as a T-server (TS), which is adapted to provide control over and enhancement to server 31. Server 31 is also adapted to function as an IPNT switch for distributing live IPNT calls to agents over LAN 39, with routing control provided by processor 33. Processor 33 is connected in this embodiment to a like processor 24, also running an instance of TS, in WAN 13 via data link 43. In this example it is the T-server functionality that spawns, controls and routes live interactions resulting from caller interaction with an embedded IP module on a visited WEB page in an instance of the present invention.

Processor 24 in WAN 13 is directly connected via a data link 45 to WEB server 28. Processor 24 is also connected via a data link 43 to processor 33 within communication center 16. The reason for connecting the two processors, as described above, is so data about an interaction may be sent ahead to communication center 16 ahead of the live interaction and routed to an agent that will accept the associated call. This enables the agent to be prepared for the incoming call. Such methods are known to the inventor with regards to CTI telephony implementation, and are equally applicable in a DNT implementation. The data link and data transfers parallel to call transmission are conveniences enhancing, but not essential to the present invention.

Processors 33 and 24 in this embodiment have some functional differences. For example, processor 24 is adapted, among other things, as a network router with TS enhancement, while Processor 33, also TS enhanced, functions primarily as a controller for the DNT call switching of server 31. Additional functionality provided with TS enhancement to both processors 33 and 24 involve monitoring and controlling WEB server 28 from within communication center 16, as well as providing similar enhancement to MIS server 31 within communication center 16.

By visiting a WEB page hosted by WEB server 28 and interacting with IP phone modules, TS 24 is caused to serve the appropriate software (if needed) for the caller to download. As previously described, such downloads are automatic requiring no action form the client other than clicking on the IP button. A WEB server such as server 28 may be dedicated to storing WEB pages having IP phone modules embedded therein, such that many different companies using the technology may share the same server.

In a preferred embodiment of the present invention one or more WEB pages provided and hosted by server 28 include one or more links to embedded IP telephony software. The links appear as icons or text on a displayed page just as conventional links do. The unique aspect of the IP telephony links in embodiments of the invention is that, by selecting such a link, an instance of an IP telephony application is transmitted to the initiator of the link who has accessed the WEB page in a manner that the application is immediately available for execution. In a preferred embodiment the application is immediately executed, and an IP call is placed to an agent of a company representing a product or service that may be advertised on or otherwise associated with the WEB page.

There may be several different forms of the embedded IP modules. For example, in one embodiment, the IP module is a Java applett, in another instance it may be PC-launchable module such as via a network browser plug-in. In still another embodiment, a Mac version may be presented, and so on. In a preferred embodiment, one IP module will support a wide variety of network-dialing options, configurations, and hardware such as may be discovered upon interaction of the module with the user's equipment.

It will be apparent to one with skill in the art that TS functionality may be provided in many different locations both within communication center 16 and at network level without departing from the spirit and scope of the present invention. For example, an instance of TS may reside on LAN connected PCNVDU's such as PCNVDU's 36a through 37e. The primary function of the TS control is to provide the necessary instruction to both WEB server 28 and MIS server 31 and to drive the routing of incoming interactions resulting from interaction with the embedded IP module.

In operation of the system as taught herein, there are distinct advantages over systems of prior art. One advantage is that directory servers such as severs 31, 33, and 35 of FIG. 1 are no longer required. Callers 17a-17d interact with a WEB server 28 enhanced according to embodiments of the present invention, with TS control. In some embodiments the embedded IP module functionality is provided by one or more applications executing directly on server 28. The TS example is a convenience. A second advantage is that callers do not have to worry about downloading and configuring IP software programs in order to communicate with communication center 16. An embedded executable module may allow one caller a single IP interaction.

In an alternate embodiment, more than one call may be allowed if an error is detected and the first call resulted in a failed connection. In addition to direct IP phone calls, an option may be presented for placing a request for a call back on a COST phone over the PSTN network.

The small download portion of the module enabling the IP call may be adapted to terminate or delete itself after it is detected that the call is terminated thus saving caller resources. When the caller again visits the same WEB page a new IP module is presented for a next call, and so on. This procedure may, in some embodiments, help to generate more hits (visits to the WEB site) for the hosting company.

Figure 3:
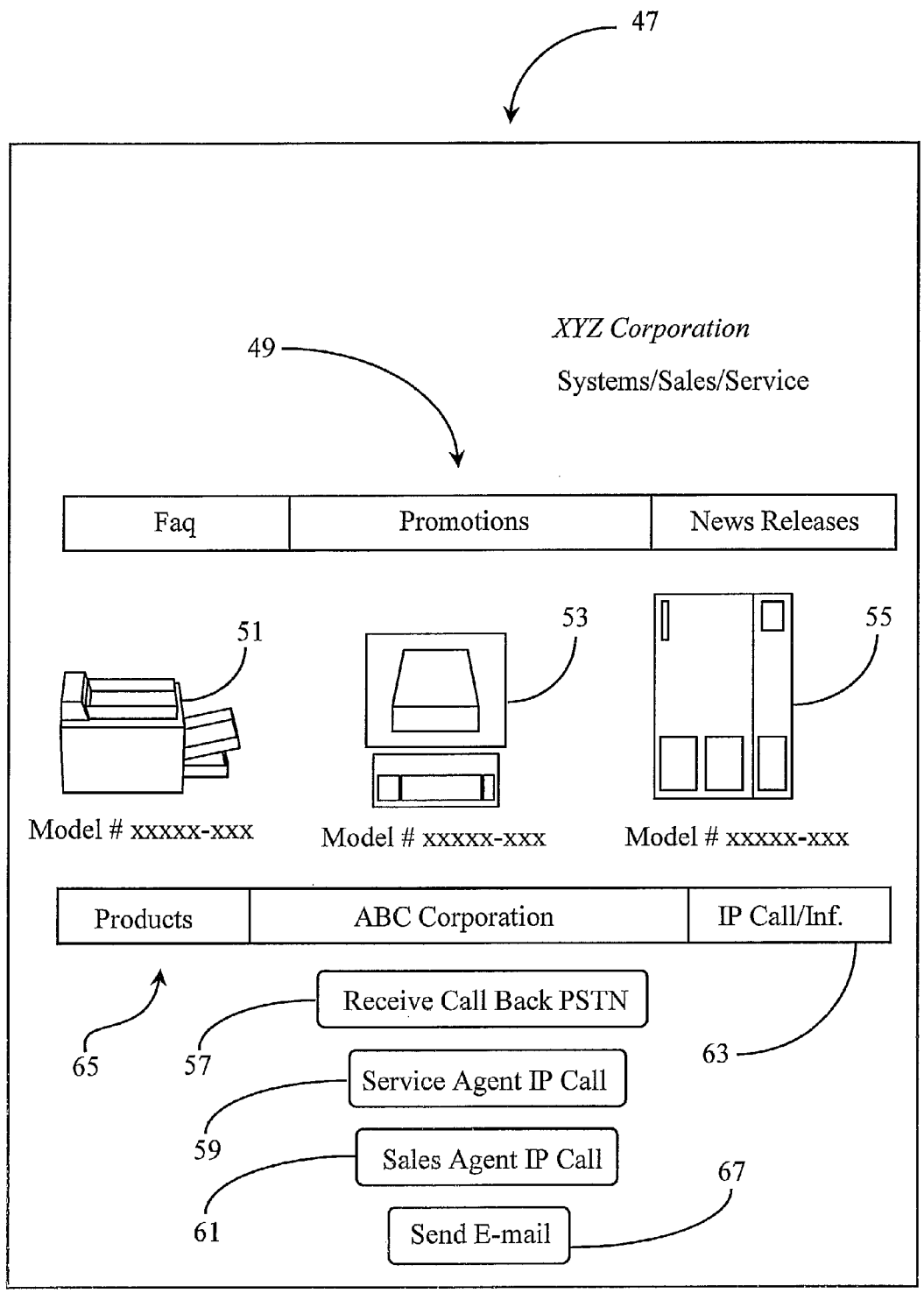
FIG. 3 is a block diagram illustrating a WEB form having embedded IP phone modules according to an embodiment of the present invention.

FIG. 3 is a block diagram illustrating a WEB form (WEB Page) having links to embedded IP phone modules according to an embodiment of the present invention. WEB form 47, such as may be stored and hosted by WEB server 28 of FIG. 2, advertises and displays a particular company's (XYZ Corporation) products and services. WEB form 47, hereinafter termed form 47, is constructed as a conventional WEB page with exception to the embedded IP phone modules which are provided in a preferred embodiment via T-server control as described with reference to FIG. 2.

An option bar 49, sometimes termed a tool bar in the art, offers visitors standard options known in the art such as Faq (frequently asked questions), promotional information, and news releases, as herein illustrated. Important company products represented by picture elements 51 (printer), 53 (PC/VDU) and 55 (Mainframe computer) are also illustrated. Such graphics may be presented in an interactive form such as is known in the art.

Three links to embedded IP phone modules are shown in form 47 and are labeled with element numbers 57, 59, and 61. Link 57 enables a person accessing the WEB form to place an IP call to the company requesting a call back using another type of media such as COST phone, etc. In the event that a live callback is requested, a TS-enhanced processor such as processor 33 of FIG. 2, may route the request to an automated attendant such as an out-dialer. When the caller is connected via COST network, then the call may be routed to the agent on a COST telephone.

Options 59 and 61 are links to live IP call options wherein activation downloads the necessary IP software module to the computer station of the person initiating the link and launches a direct IP phone call to a designated destination, such as server 31 of FIG. 2, wherein the caller waits for a next available agent to answer the IP call, with routing and queuing controlled by TS processor 33. Link 67 activates an e-mail option.

In one embodiment of the present invention, useful for WEB pages serving more than one enterprise, more than one company or corporation may have an IP phone module embedded into the same WEB page. For example, element 65 denotes a banner advertisement for ABC corporation. An IP phone module 63 allows visitors to launch a direct IP phone call to an agent or automated attendant for further information about ABC corporation. In this case, XYZ corporation hosts the WEB form and ABC corporation may have purchased the banner space from XYZ. In some embodiments the link may take the form of a telephone or other icon, for example, and the location of the link on a banner or such in the Web page influences the destination for an IP call launched by selecting the link.

It will be apparent to one with skill in the art that a WEB form may have one or more than one IP module such as may be needed for representing differing sectors of the business or businesses represented. It will also be appreciated that a company need not host an entire WEB page to have a WEB-embedded IP phone module. Banner ads and the like may be hosted by several companies on one WEB page.

Figure 4:
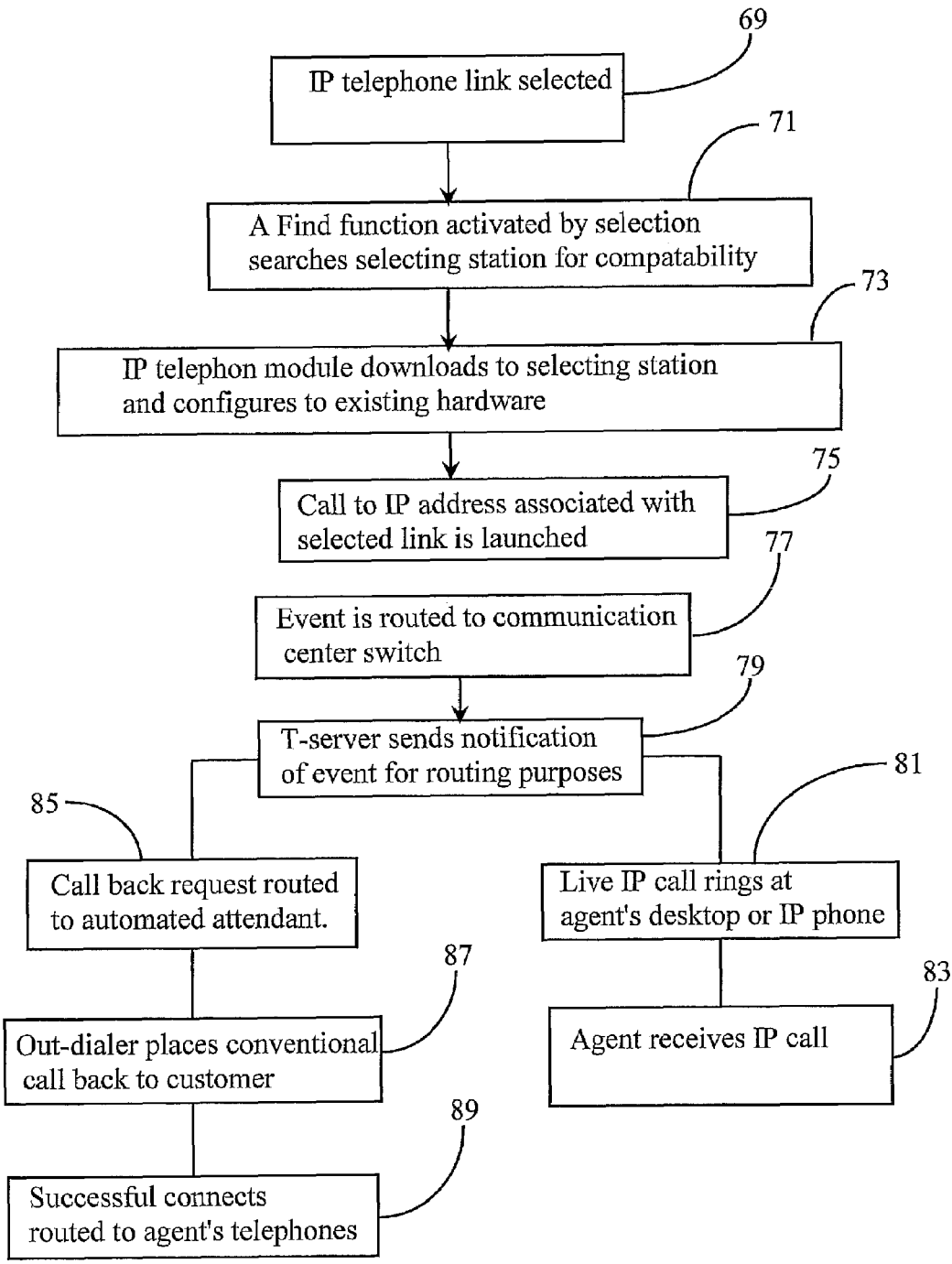
FIG. 4 is a process flow chart illustrating steps of an embedded IP phone module interaction according to an embodiment of the present invention.

FIG. 4 is a process flow chart illustrating steps of an embedded IP phone module interaction according to an embodiment of the present invention. Beginning with step 69, a person visiting a WEB site activates an executable WEB IP telephone module link typically by clicking on it with his pointer device. In a preferred embodiment a Find function associated with the link investigates the person's computer station for computability in step 71. This step may include determination of hardware type, platform type, sound card implementation including communication software installed, and so on. The purpose is to ascertain compatibility with an IP telephone function to be downloaded, and to enable configuration of the module for the person's platform.

In step 73, the download portion of the embedded IP module, which is a self-extracting executable module, transmits to the person's station installs and configures itself to approved components found in step 71. The above three steps take very little time, require no intervention, and are transparent to the person activating the link.

In step 75, the executable automatically places an IP call to a pre-set IP address and attempts to connect, according to routing rules, to either a live agent, an automated attendant, and so on. Ultimately when the call is connected, the customer will be able to speak through a standard microphone, and hear the called party on the computer's speakers. In step 77 the launched call is routed to a communication center switch such as server 31 of FIG. 2. In an enhanced embodiment data known or collected about the call or caller may also be sent from processor 24 to processor 33 located in communication center 16 via separate data link as was previously described with reference to FIG. 2.

In step 79, notification of an incoming call is routed to an available agent chosen to accept the call. At this point, the incoming IP call may be a live direct request for an agent, or perhaps a non-live request for a call back on another media type. Enterprise (company hosting communication center) rules and parameters will dictate what type of interaction is allowed and enabled. For example, a live call may be a customer requesting information only, or a call back using a different media type.

In one embodiment, a caller requesting a call back using another type of media may not have to download an executable. By clicking on the IP module, a network dialer may be used to dial the center and leave the message (customer request) and media type preferred for the call back to the customer. In this case, the customer may enter the parameters on a form before invoking the IP module.

If the call is a live direct request for an agent, the call is distributed to a selected agent in step 81. In step 83, the call rings at the appropriate equipment at the agent's station such as a PC/VDU, or a DNT capable phone. If the request is live requesting a call back, the call may be routed to an automated attendant in step 85. The attendant may collect information from the caller concerning the parameters for the return call. If the caller requests a COST call back, the request may be routed to an automatic outdialer in order to make a COST connection, perhaps over the PSTN network, with the caller in step 87. In step 89, connected call backs are routed or switched to agent's COST telephones.

The process steps above represent just one of many possible examples. Enterprise rules and parameters will determine exact sequences of steps needed to effect successful implementation of the IP phone system according to various embodiments of the present invention.

In one embodiment, the system is offered as a service to which companies may subscribe. The WEB server would contain only those company WEB forms enabling customer/agent interaction through IP phone modules.

In an alternative embodiment the present invention may be used in the private sector wherein private individuals may for whatever reason maintain IP phone modules embedded in their WEB pages. In a case such as this, equipment and software may be supplied by a third party host of the service. Hence the present invention may be implemented privately, publicly, on both small or large scales. There are many possible embodiments, many of which have already been described. The spirit and scope of the present invention is limited only by the claims that follow.

What is claimed is:

1. A system for enabling Internet Protocol Network Telephone (IPNT) communication, the system comprising:

a Web server hosting an interactive WEB page; and a link in the WEB page adapted for transmitting to an IP address an IPNT-capable telephone module;

wherein, upon selection of the link by a person accessing the WEB page over the Internet using a computer platform, an instance of the IPNT-capable telephone module is transmitted to the computer platform, where it automatically installs, launches a first IPNT call to a pre-stored IP address, and launches successive IPNT calls to the same IP address in event of call failure until a successful connection is made.

2. The system of claim 1 wherein the WEB page is a multi-tenant page representing a plurality of hosts, the different hosts are represented by different portions of the page, and different IPNT calls are launched to different destinations according to placement of links according to the different portions.

3. The system of claim 2 wherein different organizations are represented by distinct banners, and IPNT-capable modules are launched and calls placed to the different destinations by iconic links placed in the banners associated with the organizations.

4. The system of claim 1 further comprising a computer telephony integration (CTI) server executing on a CTI processor connected to the WEB server by a data link.

5. The system of claim 4 wherein the CTI server is adapted to provide the IPNT-capable telephone module.

6. The system of claim 5 wherein the CTI server has a data link separate from the Internet, and is further adapted to transmit data associated with a launched IPNT call on the separate data link.

7. The system of claim 1 wherein the downloaded instance of the IPNT-capable telephone module is one of a WEB browser plug-in.

8. The system of claim 7 wherein the downloaded instance of the IPNT-capable telephone module is adapted to uninstall and disappear after a pre-stored number of calls.

9. The system of claim 8 wherein the pre-stored number of calls is 1.

10. A method for enabling Internet Protocol Network Telephony (IPNT) communication between a first computer and a second computer, comprising steps of:
(a) placing a link in a WEB page on a WEB server, the server and page accessible by the first computer;
(b) associating the link with a IPNT-capable call module; and
(c) upon the link being selected, transmitting a copy of the IPNT-capable call module to the first computer, where it automatically installs and launches a first IPNT to the second computer, and launches successive IPNT calls to the second computer in event of call failure until a successful connection is made.

11. The method of claim 10 further comprising a step for determining characteristics of the first platform before downloading in step (c), and a step for configuring the IPNT-capable call module to the determined characteristics after downloading.

12. The method of claim 10 wherein the WEB page is a multi-tenant page representing a plurality of hosts, the different hosts are represented by different portions of the page, and different IPNT calls are launched to different hosts according to placement of links according to the different portions.

13. The method of claim 12 wherein different organizations are represented by distinct banners, and IPNT-capable modules are launched and calls placed to the different organizations by iconic links placed in the banners associated with the organizations.

14. The method of claim 10 further comprising a step for transmitting data associated with a launched IPNT call via a data link separate from the Internet.

15. The method of claim 10 wherein the IPNT-capable call module is one of a WEB browser plug-in.

16. The method of claim 15 wherein the IPNT-capable call module is adapted to uninstall and disappear after a pre-stored number of calls.

17. The method of claim 15 wherein the IPNT-capable call module is adapted to uninstall and disappear after a single successful call.

* * * * *